United States Patent
Banno et al.

(10) Patent No.: US 8,500,156 B2
(45) Date of Patent: Aug. 6, 2013

(54) STEERING WHEEL HAVING AIRBAG APPARATUS ATTACHED THERETO

(75) Inventors: Yoshiteru Banno, Kiyosu (JP); Norio Suzuki, Kiyosu (JP); Osamu Hirose, Kiyosu (JP)

(73) Assignee: Toyoda Gosei Co., Ltd., Aichi-pref., (JP)

( * ) Notice: Subject to any disclaimer, the term of this patent is extended or adjusted under 35 U.S.C. 154(b) by 48 days.

(21) Appl. No.: 13/239,506

(22) Filed: Sep. 22, 2011

(65) Prior Publication Data

US 2012/0080868 A1 Apr. 5, 2012

(30) Foreign Application Priority Data

Sep. 30, 2010 (JP) ................................. 2010-220272

(51) Int. Cl.
*B60R 21/203* (2006.01)

(52) U.S. Cl.
USPC ..................................................... 280/728.2

(58) Field of Classification Search
USPC ............... 403/315, 316, 317, 319; 280/728.2, 280/731
IPC ....... B60R 21/203, 21/2035, 21/2037, 21/21658
See application file for complete search history.

(56) References Cited

U.S. PATENT DOCUMENTS

| | | | | |
|---|---|---|---|---|
| 6,325,408 B1 * | 12/2001 | Ford | ............................ | 280/728.2 |
| 6,554,312 B2 * | 4/2003 | Sakane et al. | .............. | 280/728.2 |
| 6,719,324 B2 * | 4/2004 | Richards et al. | .............. | 280/731 |
| 6,874,808 B2 * | 4/2005 | Marath et al. | .............. | 280/728.2 |
| 7,059,631 B2 * | 6/2006 | Schorle et al. | ................ | 280/731 |
| 7,566,071 B2 | 7/2009 | Tsujimoto et al. | | |
| 8,282,123 B2 * | 10/2012 | Fukawatase et al. | ....... | 280/730.1 |
| 2003/0173759 A1 * | 9/2003 | Grenier | ..................... | 280/728.2 |
| 2010/0066062 A1 * | 3/2010 | Suzuki et al. | .............. | 280/728.2 |

FOREIGN PATENT DOCUMENTS

JP A-2007-050876 3/2007

* cited by examiner

*Primary Examiner* — Joseph Rocca
(74) *Attorney, Agent, or Firm* — Posz Law Group, PLC

(57) ABSTRACT

An elastic wire which is linearly moved in an assembling direction parallel with an orthogonal surface perpendicular to an axial line of a steering shaft and thus assembled to a core member includes an attaching part that is attached to a core member and an engaging part that is engaged into a pin in a through-hole. The core member is provided with a surface restraint part that permits the attaching part to linearly move in the assembling direction and restrains the engaged attaching part from moving in a direction parallel with the orthogonal surface. The surface restraint part includes a restraining protrusion that permits the bent part 58 of the attaching part 56 to surmount the restraining protrusion as the elastic wire is linearly moved and restrains the bent part having surmounted the restraining protrusion from moving in an opposite direction to the assembling direction.

8 Claims, 12 Drawing Sheets

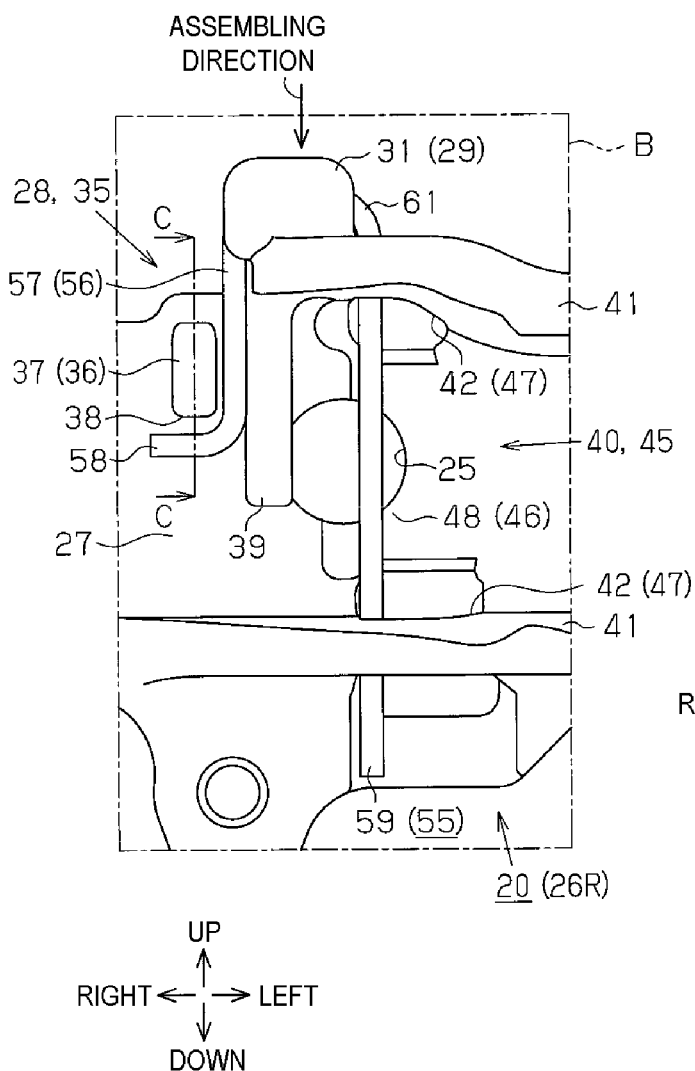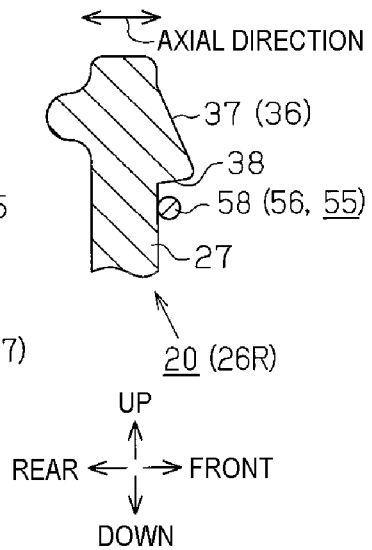

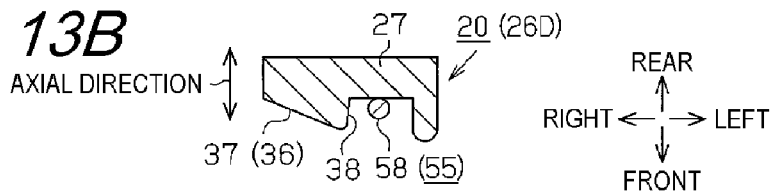
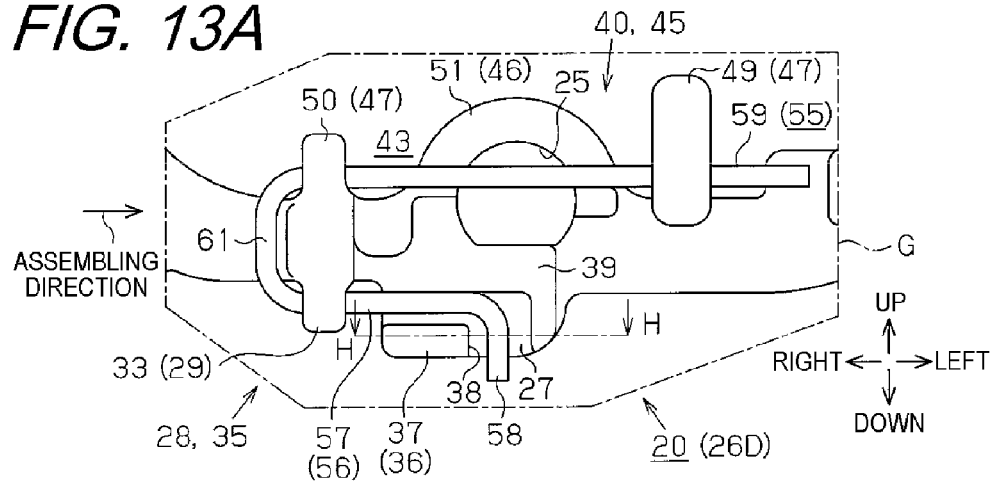
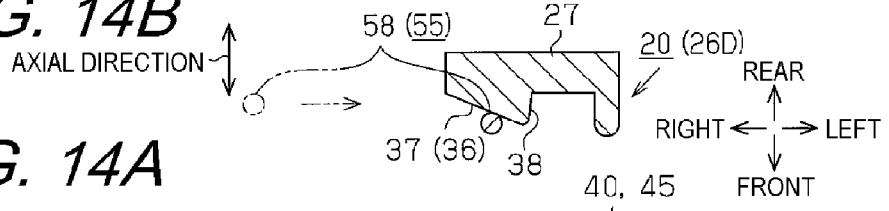
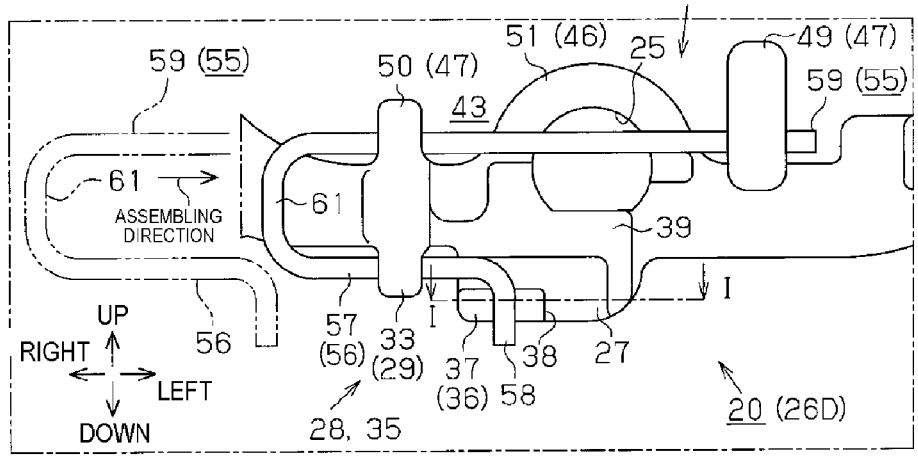

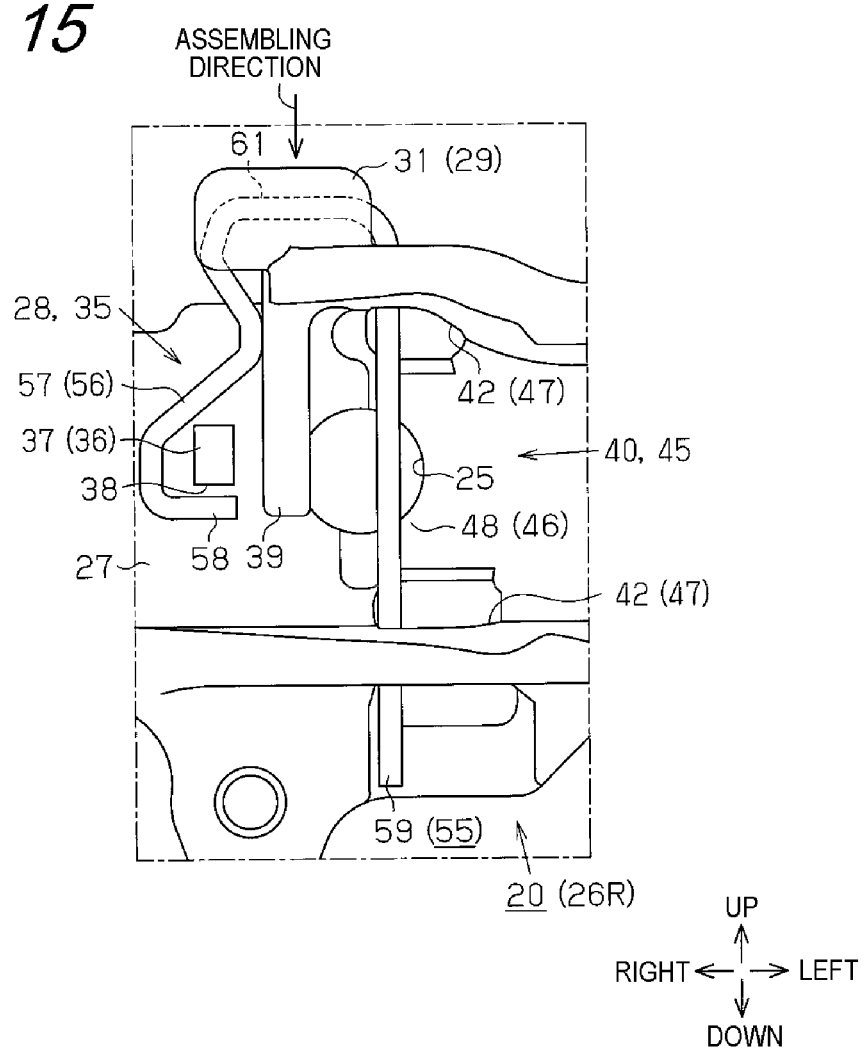

PRIOR ART

STEERING WHEEL HAVING AIRBAG APPARATUS ATTACHED THERETO

BACKGROUND OF THE INVENTION

1. Field of the Invention

The invention relates to a steering wheel having an airbag apparatus attached thereto, which has an airbag apparatus (airbag module) for protecting a driver from shock when the shock is applied to a vehicle such as automobile from a front thereof.

2. Related Art

In vehicles such as automobiles, it is necessary to protect a driver from shock when the shock is applied from a front due to a front end collision. Accordingly, a steering wheel configuring a part of a steering apparatus has been known in which an airbag apparatus (airbag module) is assembled in a pad of the steering wheel.

Regarding a structure that elastically engages the airbag apparatus to a core member configuring a frame of the steering wheel, a snap fit structure (snap lock mechanism) disclosed in Patent Document 1 has been known.

Specifically, as shown at least one of FIGS. 16A and 16B, a plurality of through-holes (insertion holes for mount pieces) 102 is formed in an axial direction (direction perpendicular to a sheet) along an axial line of a steering shaft at a plurality of positions of the core member 101. The airbag apparatus is provided with a plurality of pins (mount pieces) 104 protruding toward the core member 101, each of which has a recessed part 103 on an outer surface thereof. The pins (mount pieces) 103 are inserted into the through-holes (insertion holes for mount pieces) 102 when the airbag apparatus is elastically engaged to the core member 101.

An elastic wire (engaging spring) 105 made of spring steel and the like is moved in an assembling direction (direction parallel with the sheet) parallel with an orthogonal plane perpendicular to the axial line and then assembled to the core member 101. The elastic wire (engaging spring) 105 has an attaching part (parallel extending part) 106, an engaging part (parallel extending part) 107, a connecting part 108 and a pair of knobs 109. The attaching part (parallel extending part) 106 extends in the assembling direction and is attached to the core member 101. The engaging part (parallel extending part) 107 also extends in the assembling direction and is engaged to the recessed part 103 of the pin (mount piece) 104 in the through-hole (insertion hole for a mount piece) 102. The connecting part 108 connects one end portion of the attaching part (parallel extending part) 106 and one end portion of the engaging part (parallel extending part) 107. The knobs 109 are bent toward the axial line at each of the other end portion of the attaching part (parallel extending part) 106 and the other end portion of the engaging part (parallel extending part) 107. The knobs 109 are gripped when elastically deforming the attaching part (parallel extending part) 106 and the engaging part (parallel extending part) 107 so as to narrow an interval between the other end portions thereof.

The pin (mount piece) 104 inserted into the through-hole (insertion hole for a mount piece) 102 is elastically engaged to the metal core 101 as the engaging part (parallel extending part) 107 is engaged to the recessed part 103.

In the meantime, the core member 101 is provided with an assembly part 114 that extends in the assembling direction. The assembly part 114 has an axial restraint part 111, a surface restraint part 112 and a movement permission part 113. When assembling the elastic wire (engaging spring) 105 to the assembly part 114, the axial restraint part 111 permits the attaching part (parallel extending part) 106 to move and restrains the attaching part (parallel extending part) 106 engaged to the core member 101 from moving in the axial direction. When assembling the elastic wire (engaging spring) 105 to the assembly part 114, the surface restraint part 112 permits the attaching part (parallel extending part) 106 to move and restrains the engaged attaching part (parallel extending part) 106 from moving in a direction parallel with the orthogonal plane. A protrusion 112A, which configures a part of the surface restraint part 112, is provided on a path through which the attaching part (parallel extending part) 106 passes when it is linearly moved toward the assembly part 114, so that the protrusion restrains the engaged attaching part (parallel extending part) 106 from moving in an opposite direction to the assembling direction. When assembling the elastic wire (engaging spring) 105 to the assembly part 114, the movement permission part 113 permits the engaging part (parallel extending part) 107 to move.

The protrusion 112A of the surface restraint part 112 becomes an obstacle when linearly moving the attaching part (parallel extending part) 106 toward the assembly part 114. Accordingly, even when the elastic wire (engaging spring) 105 is arranged on the extension line of the assembly part 114 and is linearly moved in the direction parallel with the assembly part 114, it is not possible to assemble the elastic wire (engaging spring) 105 to the assembly part 114.

Thus, when assembling the elastic wire (engaging spring) 105 to the assembly part 114, the elastic wire (engaging spring) 105 is first arranged at a position that is offset from the assembly part 114, as shown in FIG. 16A. As shown with the dashed-dotted arrow in FIG. 16A, the elastic wire (engaging spring) 105 is moved in the assembly part 114 while changing a posture thereof so as to bypass the protrusion 112A. At this time, the movement of the attaching part (parallel extending part) 106 is permitted by the axial restraint part 111 and the surface restraint part 112. In addition, the movement of the engaging part (parallel extending part) 107 is permitted by the movement permission part 113.

When the elastic wire (engaging spring) 105 is moved to a position at which the attaching part (parallel extending part) 106 passes to the protrusion 112A, the axial movement of the attaching part (parallel extending part) 106 is restrained from moving in the axial direction by the axial restraint part 111 and the movement in the direction parallel with the orthogonal surface is restrained by the surface restraint part 112.

In the above descriptions about JP 2007-50876A, the names in the parentheses following the member names indicate the member names used in Patent Document 1.

However, in JP 2007-50876A in which the part (protrusion 112A) of the surface restraint part 112 is provided on the path through which the attaching part (parallel extending part) 106 passes when it is linearly moved toward the assembly part 114, the moving direction of the elastic wire (engaging spring) 105 should be changed when assembling the elastic wire (engaging spring) 105 to the core member 101, as described above. Therefore, it takes time to assemble the elastic wire (engaging spring) 105, so that the assembling time is prolonged.

SUMMARY OF THE INVENTION

The invention has been made to solve the above problem. An object of the invention is to provide a steering wheel having an airbag apparatus attached thereto, which enables an elastic wire to be simply assembled to a core member, thereby shortening the assembling time.

First aspect of the invention provides a steering wheel having an airbag apparatus attached thereto, the steering wheel including:

a core member having a through-hole that is penetrated in an axial direction parallel with an axial line of a steering shaft;

an airbag apparatus having a pin that protrudes toward the core member, has a recessed part on an outer surface thereof and is inserted into the through-hole, and an elastic wire that is linearly moved in an assembling direction parallel with an orthogonal surface perpendicular to the axial line and is thus assembled to the core member, wherein the elastic wire has an attaching part that is attached to the core member and an engaging part that is engaged to the recessed part in the through-hole, wherein the core member has an axial restraint part that permits the attaching part to linearly move in the assembling direction and restrains the attaching part engaged to the core member from moving in the axial direction, a surface restraint part that permits the attaching part to linearly move in the assembling direction and restrains the engaged attaching part from moving in a direction parallel with the orthogonal surface, and a linear movement permission part that permits the engaging part to linearly move in the assembling direction, and wherein the surface restraint part has a restraining protrusion that permits the attaching part to surmount the restraining protrusion as the attaching part is linearly moved and restrains the attaching part having surmounted the restraining protrusion from moving in an opposite direction to the assembling direction.

According to the above configuration, when assembling the elastic wire to the core member, the elastic wire is linearly moved in the assembling direction. The assembling direction is one of directions parallel with the orthogonal surface perpendicular to the axial line of the steering shaft.

At this time, in the axial restraint part and the surface restraint part of the core member, the linear movement of the attaching part in the assembling direction is permitted. Also, in the linear movement permission part, the linear movement of the engaging part in the assembling direction is permitted.

The attaching part passes to the restraining protrusion while linearly moving along the surface restraint part. At this time, in the restraining protrusion, the surmounting of the attaching part is permitted. Accordingly, the restraining protrusion does not block the linear movement of the attaching part. Contrary to the related art, it is not necessary to move the attaching part so as to bypass the restraining protrusion.

When the attaching part is linearly moved to a position, at which the attaching part surmounts the restraining protrusion, and is thus engaged to the core member, the attaching part is restrained from moving in the axial direction by the axial restraint part and the attaching part is restrained from moving in the direction parallel with the orthogonal surface by the surface restraint part.

Particularly, in the surface restraint part, the attaching part is restrained from moving in an opposite direction to the assembling direction by the restraining protrusion.

Like this, when the elastic wire is just linearly moved in the assembling direction, the elastic wire is assembled to the core member with the attaching part being restrained from moving in the axial direction and in the direction parallel with the orthogonal surface.

A pin of an airbag apparatus is inserted into a through-hole of the core member to which the elastic wire has been assembled, as described above. The engaging part of the elastic wire is engaged to a recessed part of the pin, so that the airbag apparatus is elastically engaged to the core member.

In second aspect of the invention, the attaching part may have an attaching main body part that extends in the assembling direction and a bent part that is bent from an extension end of the attaching main body part in a direction intersecting with the assembling direction on the orthogonal surface. The bent part of the attaching part may be restrained from surmounting the restraining protrusion and moving in the opposite direction to the assembling direction as the elastic wire is linearly moved.

According to the above configuration, when the elastic wire is linearly moved in the assembling direction, the attaching main body part and the bent part, which configure the attaching part, are permitted to linearly move in the surface restraint part.

The bent part passes to the restraining protrusion while linearly moving along the surface restraint part. At this time, the surmounting of the bent part is permitted in the restraining protrusion. When the bent part is linearly moved to a position at which it surmounts the restraining protrusion, the bent part is restrained from moving in the opposite direction to the assembling direction by the restraining protrusion.

In third aspect of the invention, the core member may have a sliding base part that the attaching parts slides thereon as the elastic wire is linearly moved and may have the restraining protrusion protruding therefrom. The restraining protrusion may have an inclined surface that is more distant from the sliding base part at a more forward side thereof in the assembling direction and a step surface that is substantially perpendicular to the sliding base part at a front side of the inclined surface in the assembling direction. The inclined surface may enable the bent part to be distant from the sliding base part against elastic force of the attaching part linearly moving in the assembling direction. The step surface may restrain the bent part, which is made to approach the sliding base part by elastic restoring force of the attaching part, from moving in the opposite direction to the assembling direction.

According to the above configuration, when the elastic wire is linearly moved in the assembling direction, the attaching part slides on the sliding base part. Accompanied with the sliding, when the bent part of the attaching part passes to the inclined surface of the restraining protrusion, it is possible to enable the bent part to be more distant from the sliding base part at a more forward side thereof in the assembling direction, against the elastic force of the attaching part. When the bent part moves into the step surface from the inclined surface, i.e., when the bend part surmounts the restraining protrusion, the bent part is made to approach the sliding base part by the elastic restoring force of the attaching part. At this state, the restraining protrusion is positioned adjacent to the bent part in the opposite direction to the assembling direction, so that the bent part is restrained from moving in the opposite direction to the assembling direction by the restraining protrusion.

According to the above configuration, when the elastic wire is linearly moved in the assembling direction, the attaching main body part and the bent part, which configure the attaching part, are permitted to linearly move in the surface restraint part. The attaching main body part, which is permitted to linearly move, is linearly moved in the assembling direction along the guide wall part extending in the assembling direction adjacent to the restraining protrusion. At a state in which the attaching part is engaged to the core member, the attaching main body part is disposed between the restraining protrusion and the guide wall part, so that the attaching main body part is restrained from moving in the direction parallel with the orthogonal direction, which is a direction perpendicular to the assembling direction.

In fifth aspect of the invention, the bent part may be bent in a direction getting away from the engaging part.

According to the above configuration, the leading end of the bent part is positioned at a location distant from the guide wall part. Accordingly, when the attaching main body part of the elastic wire is linearly moved along the guide wall part in the assembling direction, the leading end of the bent part does not interfere with the guide wall part.

In sixth aspect of the invention, the axial restraint part may have, as a part of the axial restraint part, the sliding base part and also may have a sub-restraint part that is provided at a position deviated from the sliding base part regarding the axial direction. The attaching main body part may be linearly moved along the sliding base part in the assembling direction when the attaching part is linearly moved, and the attaching main body part may be disposed between the sliding base part and the sub-restraint part and may be thus restrained from moving in the axial direction when the attaching part is engaged to the core member.

According to the above configuration, when the elastic wire is linearly moved in the assembling direction, the attaching main body part and the bent part, which configure the attaching part, are permitted to linearly move in the axial restraint part. The attaching main body part, which is permitted to linearly move, is linearly moved along the sliding base part in the assembling direction. At a state in which the attaching part is engaged to the core member, the attaching main body part is disposed between the sliding base part and the sub-restraint part, which is provided at a position deviated from the sliding base part regarding the axial direction, so that the attaching main body part is restrained from moving in the axial direction.

In seventh aspect of the invention, the core member may further include a second axial restraint part that restrains the engaging part, which is permitted by the linear movement permission part and has been thus linearly moved in the assembling direction, from moving in the axial direction.

According to the above configuration, the engaging part of the elastic wire having linearly moved in the assembling direction is restrained from moving in the axial direction by the second axial restraint part of the core member.

In eighth aspect of the invention, the second axial restraint part may have a pair of restraining wall parts, which are provided at positions offset from each other regarding the axial direction. The engaging part may pass between both the restraining wall parts when the engaging part is linearly moved, and the engaging part may be disposed between both the restraining wall parts at a state in which the engaging part has been linearly moved in the assembling direction, so that the engaging part is restrained from moving in the axial direction.

According to the above configuration, when the elastic wire is linearly moved in the assembling direction, the linear movement of the engaging part is permitted in the linear movement permission part. The engaging part, which is permitted to linearly move, passes between a pair of restraining wall part of the second axial restraint part, which are provided at positions offset from each other regarding the axial direction, so that the engaging part is restrained from moving in the axial direction.

According to the steering wheel having the airbag apparatus attached thereto, it is possible to simply assemble the elastic wire to the core member, thereby shortening the assembling time.

BRIEF DESCRIPTION OF THE DRAWINGS

FIG. 8A is a view showing a state in which the elastic wire is assembled to the right assembly part, which is a partial rear view enlarging a B part of FIG. 2, and FIG. 8B is a partial sectional view showing a sectional structure taken along a line C-C in FIG. 8A.

FIGS. 9A and 9B are views corresponding to FIGS. 8A and 8B, in which FIG. 9A is a partial rear view showing a state in which the elastic wire is being assembled to the right assembly part, and FIG. 9B is a partial sectional view showing a sectional structure taken along a line D-D in FIG. 9A.

FIGS. 10A and 10B are views corresponding to FIGS. 8A and 8B, in which FIG. 10A is a partial rear view showing a state in which the elastic wire is being assembled to the right assembly part, and FIG. 10B is a partial sectional view showing a sectional structure taken along a line E-E in FIG. 10A.

FIG. 13A is a view showing a state in which the elastic wire is assembled to the lower assembly part, which is a partial rear view enlarging a G part of FIG. 2, and FIG. 13B is a partial sectional view showing a sectional structure taken along a line H-H in FIG. 13A.

FIGS. 14A and 14B are views corresponding to FIGS. 13A and 13B, in which FIG. 14A is a partial rear view showing a state in which the elastic wire is being assembled to the lower assembly part, and FIG. 14B is a partial sectional view showing a sectional structure taken along a line I-I in FIG. 14A.

FIG. 15 is a view corresponding to FIG. 8A, which is a partial rear view showing a state in which an elastic wire having a shape different from the above illustrative embodiment is assembled to the right assembly part.

FIGS. 16A and 16B are views showing the related art, in which FIG. 16A is a partial front view showing a state in which an elastic wire is being assembled to an assembly part of a core member and FIG. 16B is a partial front view showing a state in which the elastic wire is assembled to the assembly part and a pin is engaged to the elastic wire.

DETAILED DESCRIPTION OF THE PREFERRED EMBODIMENTS

Figure 1:
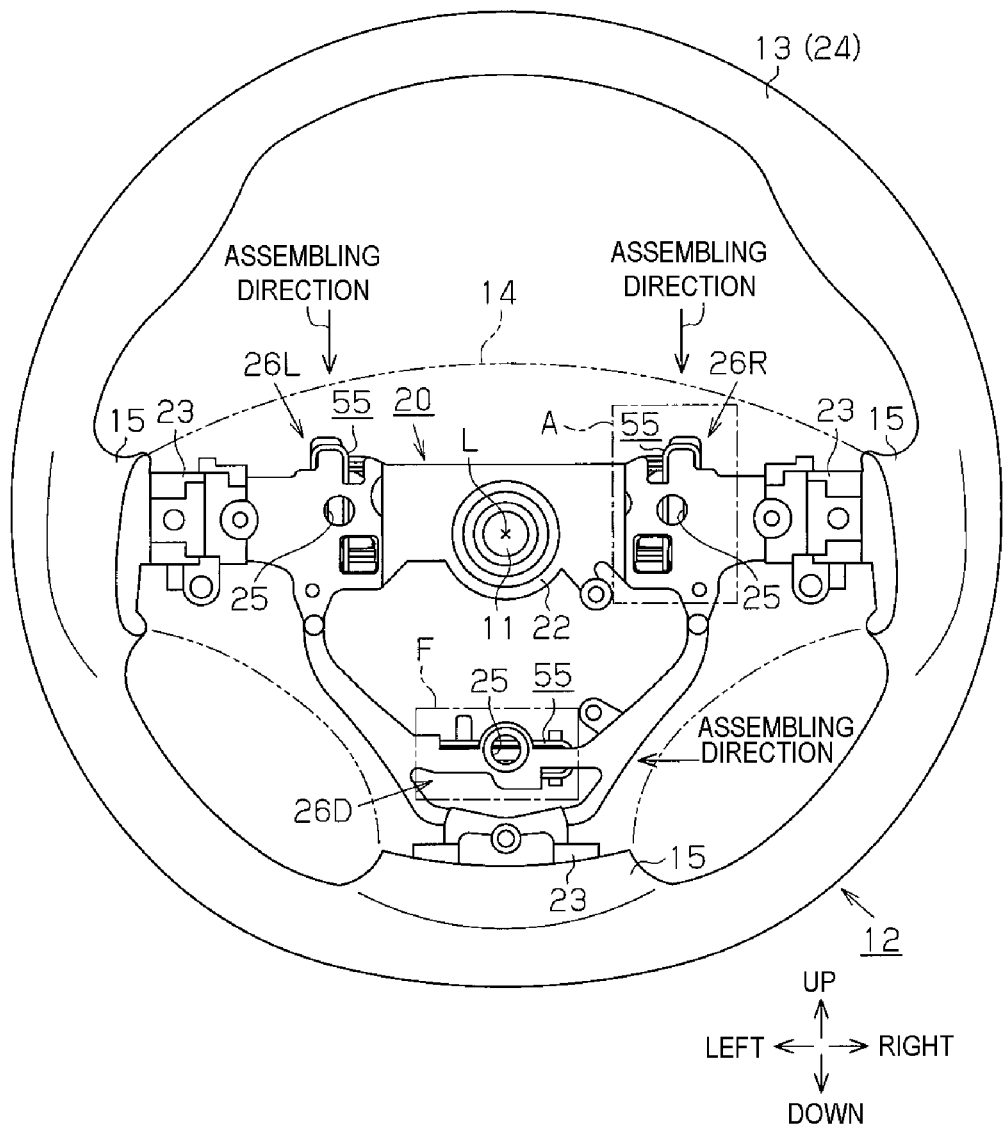
FIG. 1 is a schematic front view of a steering wheel having an airbag apparatus attached thereto according to an illustrative embodiment of the invention, in which a part of the steering wheel is omitted.

Hereinafter, an illustrative embodiment in which the invention is applied to a steering wheel having an airbag apparatus for a vehicle attached thereto will be described with reference to FIGS. 1 to 14. As shown in at least one of FIGS. 1, 2 and 4, a steering shaft 11 that is rotated about an axial line L is obliquely provided at a front of a driver's seat of a vehicle (at a right side in FIG. 4) so that it is higher at the driver's seat (at a left side in FIG. 4). A steering wheel having an airbag apparatus attached thereto according to this illustrative embodiment (hereinafter, referred to as 'steering wheel') 12 is integrally and rotatably mounted to a rear end of the steering shaft 11.

The steering wheel 12 has a rim part (which is also referred to as a steering wheel part and a ring part) 13, a pad part 14 and a spoke part 15. The rim part 13 is a member that is gripped and steered by a driver, and has a substantial ring shape about the axial line L (refer to FIG. 1, for example). Since the steering shaft 11 is inclined as described above, the rim part 13 is also inclined so that it is closer to the driver at a lower part thereof (refer to FIG. 4).

The pad part 14 is disposed in a space surrounded by the rim part 13. A front side of the pad part 14 is configured by a lower cover 16 (refer to FIG. 4). The spoke part 15 is provided at a plurality of positions between the rim part 13 and the pad part 14.

In this illustrative embodiment, the respective parts of the steering wheel 12 are described, based on the axial line L of the steering shaft 11. A direction parallel with the axial line L is referred to as a 'front-rear direction' of the steering wheel 12, and a direction, along which the steering wheel 12 stands up, of directions perpendicular to the axial line L, is referred to as an 'up-down direction.' Accordingly, the front-rear and up-down directions of the steering wheel 12 are slightly inclined with respect to a front-rear direction (horizontal direction) and an up-down direction (vertical direction) of a vehicle.

In order to specify the circumferential positions of the rim part 13, 'up', 'down', 'left' and 'right' are defined, based on a state in which the vehicle travels straightly, i.e., a neutral state.

Figure 2:
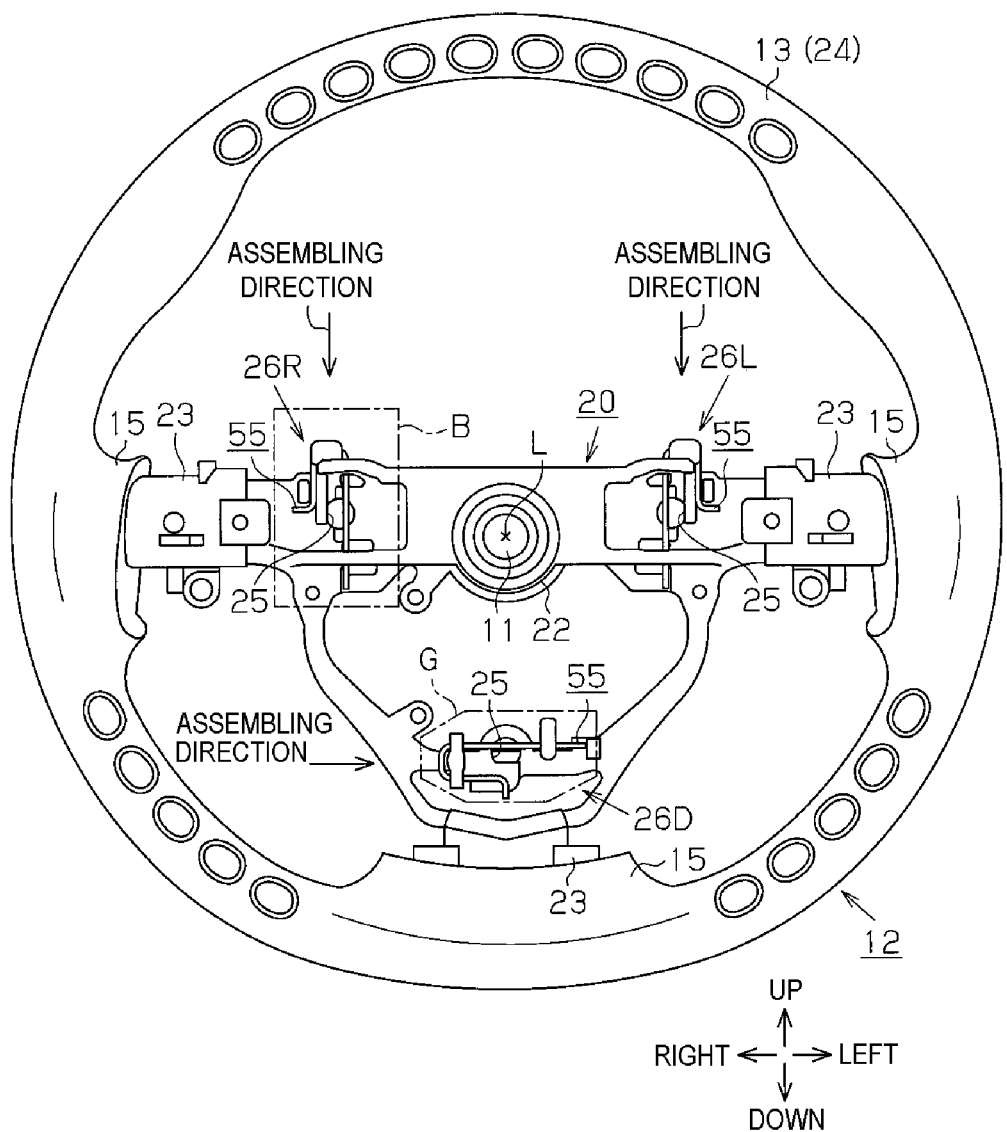
FIG. 2 is a schematic rear view of the steering wheel having an airbag apparatus attached thereto, in which a part of the steering wheel is omitted.

As shown in at least one of FIGS. 1 and 2, a core member 20, which is made of iron, aluminum, magnesium or alloy thereof, is mounted in the respective insides of the configuration members (rim part 13, pad part 14 and spoke part 15) of the steering wheel 12. A part of the core member 20, which is located inside the rim part 13, has a substantial ring shape when seen from a driver side (when seen from the front), is called as a rim part core member (not shown) and forms a frame of the rim part 13.

In addition to the rim part core member, the core member 20 has a boss part core member 22 on the axial line L and a spoke part core member 23 that forms a frame of the spoke part 15 and connects the boss part core member 22 and the rim part core member. The core member 20 having the above configuration is attached to a rear end portion of the steering shaft 11 at the boss part core member 22 so that it is integrally rotatable.

Most of the rim part core member is covered by a soft covering part 24. The soft covering part 24 is entirely formed by resin molding using soft (elastic) material such as foamed polyurethane.

Through-holes 25 that are penetrated in the axis direction parallel with the axial line L of the steering shaft 11 are formed at a plurality of positions of the core member 20. The plurality of positions includes left, right and lower sides of the boss part core member 22. Pins 74 of horn switch mechanisms 70 are inserted into the respective through-holes 25. Elastic wires 55 are disposed adjacent to the front side of the respective through-hoes 25 and are assembled to the core member 20. The configuration of the respective elastic wires 55, the assembling structure of the respective elastic wires 55 to the core member 20 and the like will be described in the below.

Figure 3:
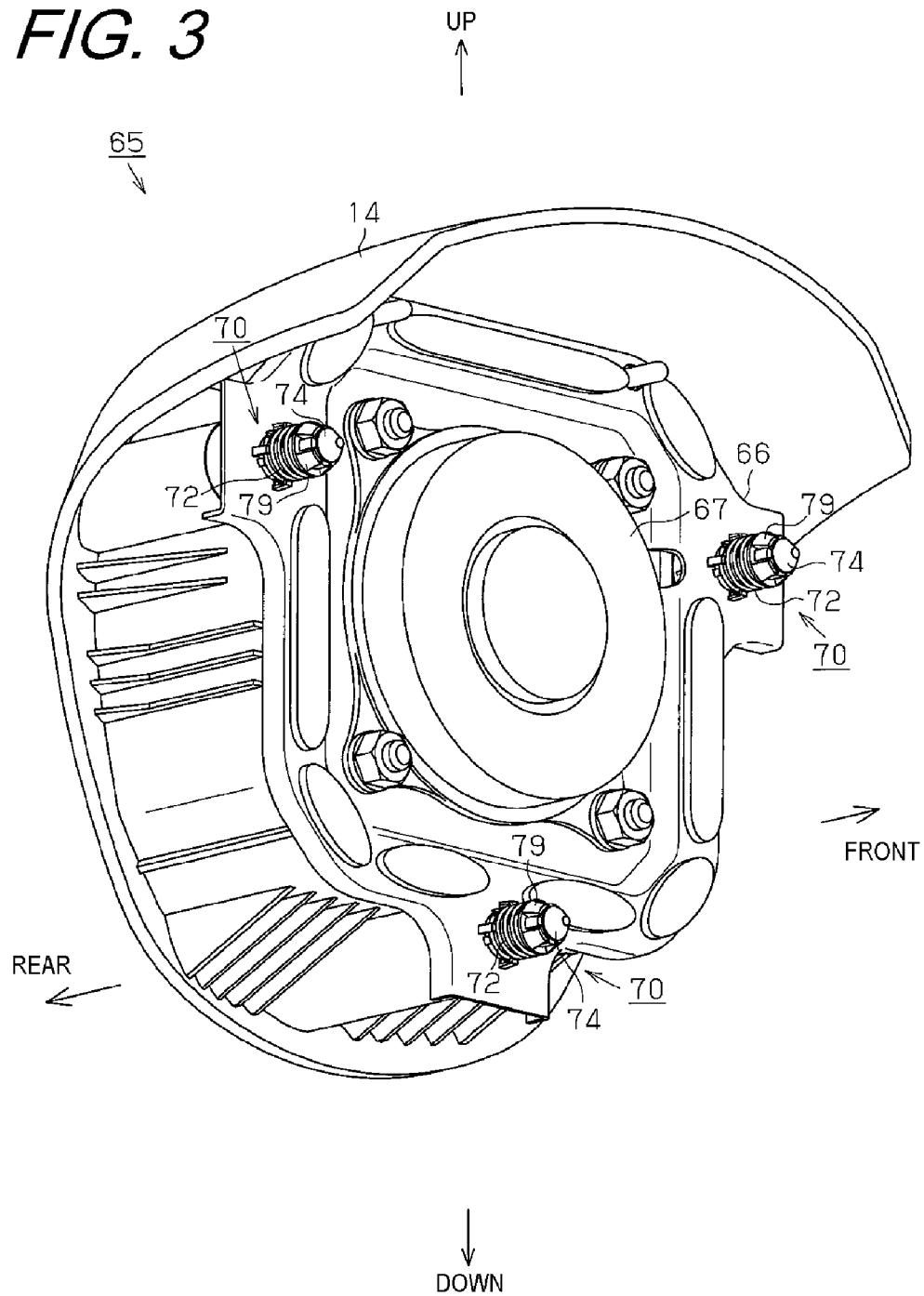
FIG. 3 is a perspective view of an airbag apparatus, which is obliquely seen from a front of a vehicle.
Figure 4:
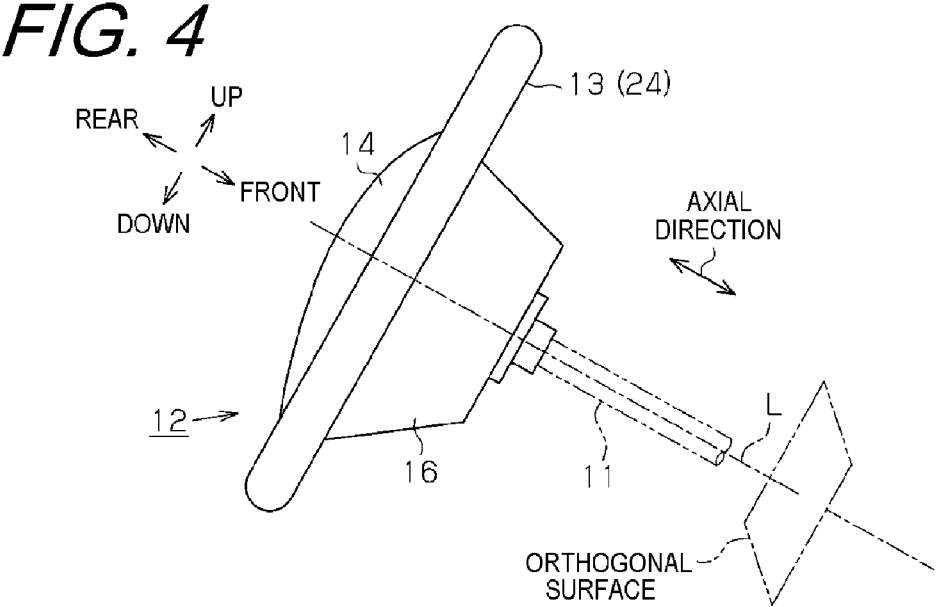
FIG. 4 is a schematic side view of the steering wheel having an airbag apparatus attached thereto.
Figure 5:
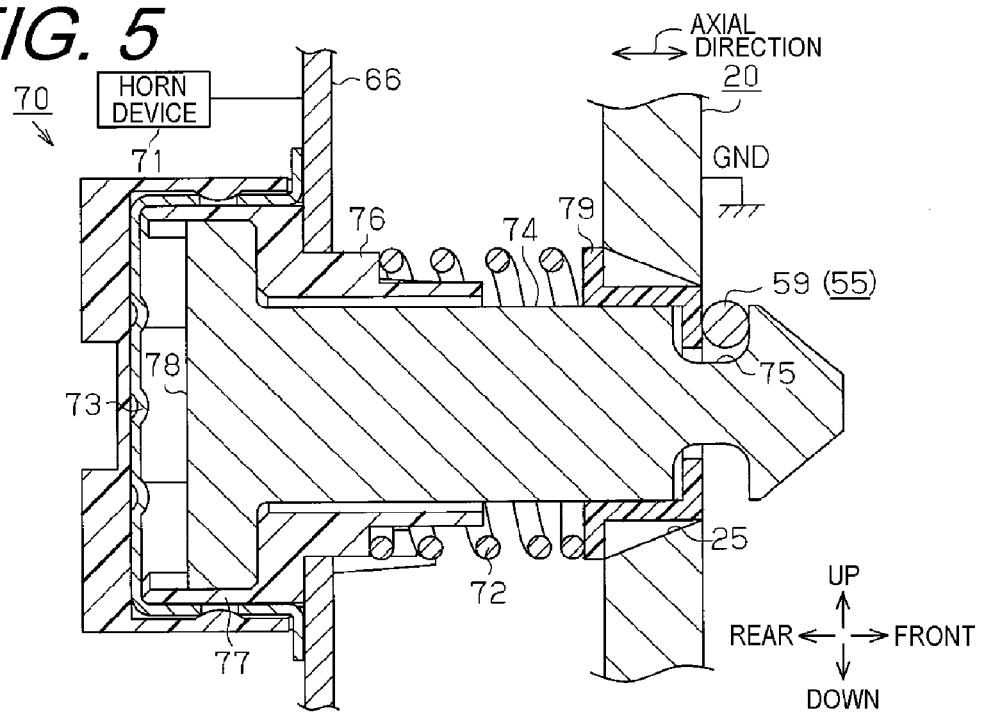
FIG. 5 is a sectional view showing a state in which an airbag apparatus is elastically engaged to a core member in a horn switch mechanism.
Figure 6:
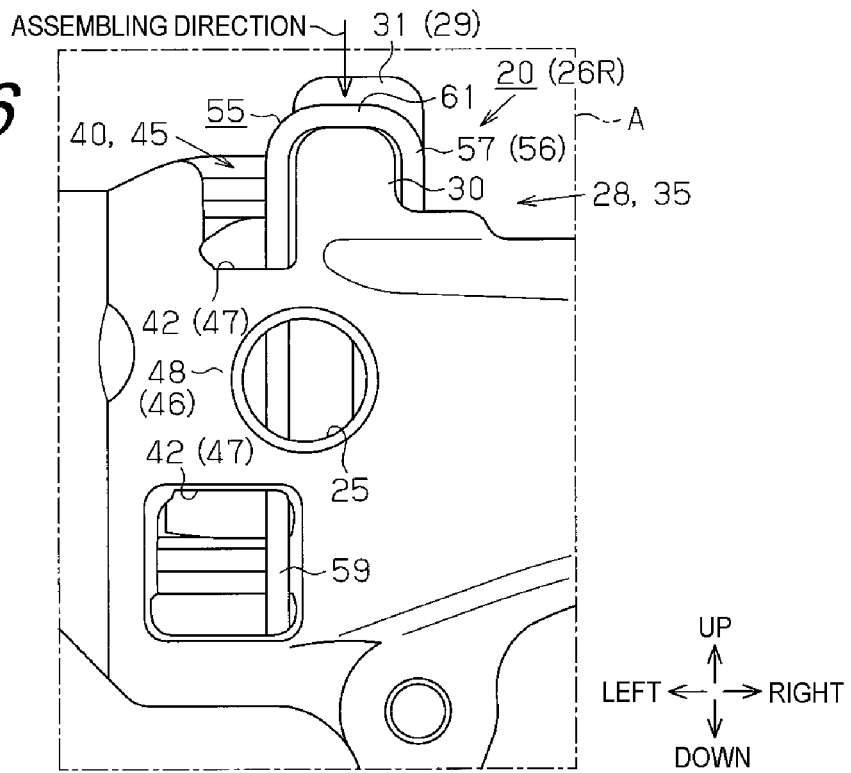
FIG. 6 is a view showing a state in which an elastic wire is assembled to a right assembly part, which is a partial front view enlarging an A part of FIG. 1.

As shown in at least one of FIGS. 3 and 5, an airbag apparatus 65 is engaged to the core member 20 through a plurality of horn switch mechanisms 70. The airbag apparatus 65 is configured by assembling the pad part 14, an airbag (not shown), an inflator 67 and the like to a bag holder 66. When shock is applied from the front to a vehicle due to the front end collision and the like, gas for inflating is ejected from the inflator 67 of the airbag apparatus 65, so that the airbag is inflated. During the inflation, the pad part 14 is fractured and the airbag passes through the pad part 14 and is inflated between the steering wheel 12 and a driver, so that the shock to be applied to the driver is alleviated.

The respective horn switch mechanisms 70 are provided to operate a horn device 71 mounted to the vehicle when the airbag apparatus 65 is pressed, and are mounted to positions of the bag holder 66 of the airbag apparatus 65, which correspond to the through-holes 25 of the core member 20. Each horn switch mechanism 70 has a pressing member 72, a moveable side contact part 73 and a metal pin (support member) 74.

The pressing member 72 presses the bag holder 66 in a direction getting away from the core member 20 (in a rearward direction). The moveable side contact part 73 moves in the axial direction of the steering shaft 11 together with the bag holder 66. Each pin 74 protrudes from the bag holder 66 of the airbag apparatus 65 toward the core member 20. Each pin 74 is formed on an outer surface of a front end portion thereof with an annular recessed part 75. The front end portion of the pin 74 is inserted into the through-hole 25, so that the pin is elastically engaged to the core member 20 by the elastic wire 55. The pin 74 is inserted into an insulation member 76 mounted to the bag holder 66, thereby supporting the bag holder 66, the insulation member 76 and the moveable side contact part 73 so that they can move in the axial direction. A pressure bearing part 77 that bears rearward pressing force of the pressing member 72 is provided at a more rear side of the pin 74 than the bag holder 66. A rear end surface of the pin 74 forms a fixing side contact part 78 that is contacted and spaced to and from the moveable side contact part 73.

In the steering wheel 12 to which the horn switch mechanisms 70 are assembled, at a normal state in which the airbag apparatus 65 is not pressed or the excessive load is not applied to the airbag apparatus 65, the moveable side contact part 73 is distant from the fixing side contact part 78 of the pin 74, so that the contact parts 73, 78 are electrically insulated from each other and the horn device 71 is not thus operated.

On the other hand, when the airbag apparatus 65 is pressed or the excessive load is applied to the airbag apparatus 65, the moveable side contact part 73 is forward moved together with the bag holder 66 and the insulation member 76. When the moveable side contact part 73 is brought into contact with the fixing side contact part 78 and the conduction state is thus made, the horn device 71 is operated.

In addition, a resin member 79 is interposed between a wall surface of the through-hole 25 of the core member 20 and the pin 74. The resin member 79 is to suppress abnormal sound form being generated at an attaching part of the horn switch mechanism 70 to the core member 20 when the airbag apparatus 65 is pressed, for example. In other words, when the bag holder 66 is moved forward, as described above, the rearward pressing force of the pressing members 72, which is being applied to the pressure bearing parts 77 of the pins 74 through the bag holder 66, is lost. Therefore, the pins 74 can be rotated about the parts serving as support points, at which the pins are engaged to the core member 20 by the elastic wires 55. However, the resin members 79, which are interposed between the wall surfaces of the through-holes 25 of the core member 20 and the elastic wires 55, restrain the metal pins 74 from being brought into contact with the wall surfaces of the through-holes 25 of the core member 20. In the meantime, even when the pins 74 are brought into contact with the resin members 79 and sound is thus generated, the sound is less than a case where the pins 74 are brought into contact with the wall surfaces, i.e., the metals are contacted to each other, and is not harsh to the ears.

As described above, the airbag apparatus 65 is elastically engaged to the core member 20 through the plurality of horn switch mechanisms 70.

In the followings, the configuration of the respective elastic wires 55, and the assembling structure of the respective elastic wires 55 to the core member 20 are described.

<Configuration of Each Elastic Wire 55>

The respective elastic wires 55 are mounted at the front side of the core member 20 for the respective through-holes 25. The three elastic wires 55 have a common shape.

As shown in at least one of FIGS. 1 and 2, each elastic wire 55 is linearly moved in an assembling direction parallel with the orthogonal surface (refer to FIG. 4) perpendicular to the axial line L of the steering shaft 11 and thus assembled to the core member 20, and is formed of a metal wire rod of spring steel and the like. Here, while the assembling direction of the left and right elastic wires 55 is from up side to down side, the assembling direction of the lower elastic wire 55 is from right to left.

Figure 7:
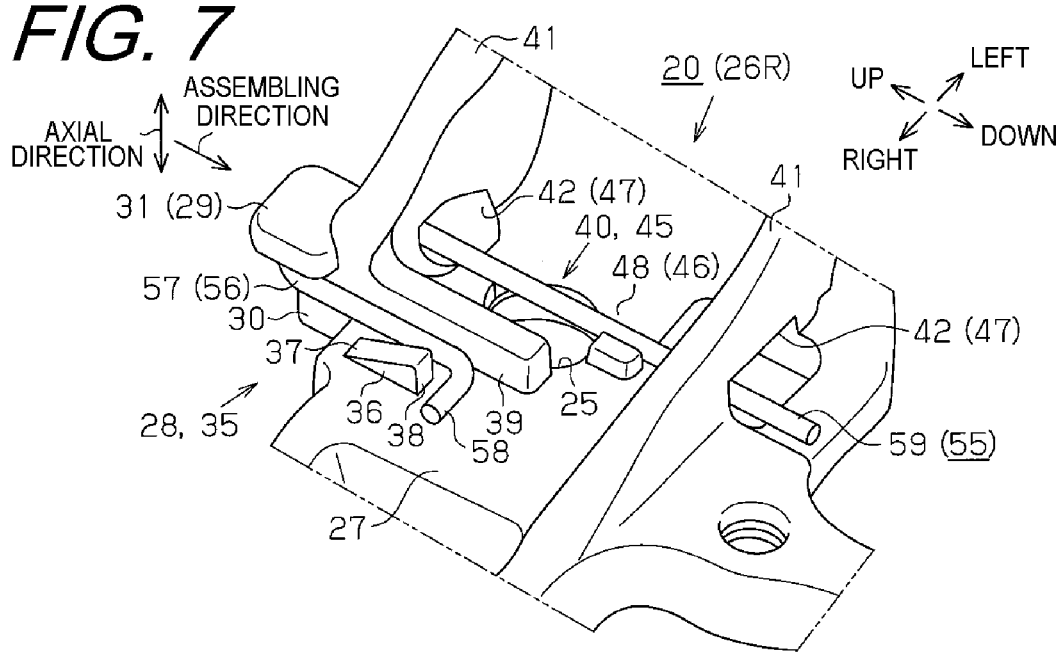
FIG. 7 is a partial perspective view showing a state in which the elastic wire is assembled to the right assembly part.
Figure 12:
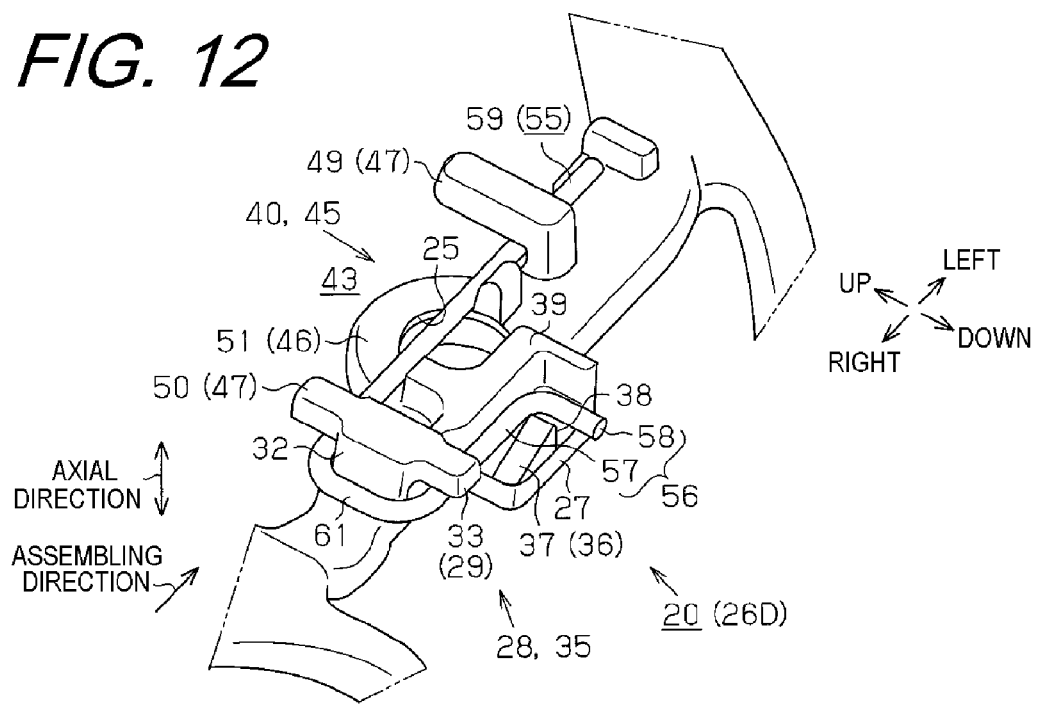
FIG. 12 is a partial perspective view showing a state in which the elastic wire is assembled to the lower assembly part.
Figure 16A:
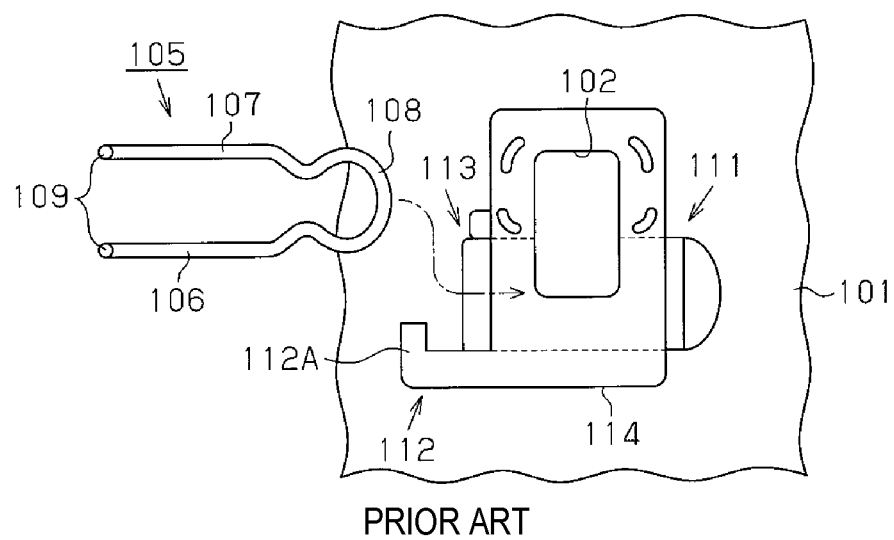
Figure 16B:
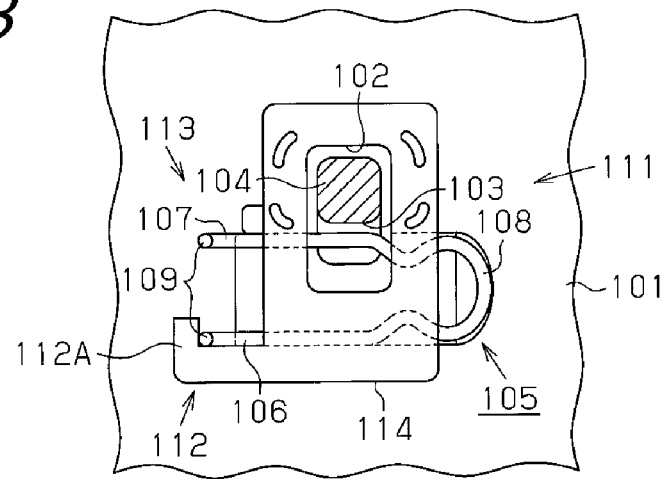

As shown in at least one of FIGS. 7 and 12, each elastic wire 55 has an attaching part 56 that is attached to the core member 20, an engaging part 59 that is engaged into the recessed part 75 (refer to FIG. 5) of the pin 74 in the through-hole 25 and a connecting part 61 that connects the attaching part 56 and the engaging part 59. Each elastic wire 55 is contacted at its part, for example an end portion to the core member 20. Each elastic wire 55 has a function of elastically engaging the pin 74 of the horn switch mechanism 70 to the core member 20 under conduction state, and a part of each engaging part 59 is positioned adjacent to the front of the through-hole 25.

The engaging part 59 of the elastic wire 55 straightly extends in the assembling direction. Although the attaching part 56 of the elastic wire 55 extends in substantially parallel with the engaging part 59, it has a straight attaching main body part 57 shorter than the engaging part 59 and a bent part 58 that is bent from the extension end of the attaching main body part 57 in a direction perpendicular to the assembling direction on the orthogonal surface. Here, the bent part 58 is bent in a direction getting away from the engaging part 59. The connecting part 61 extends in a direction perpendicular to the assembling direction and is connected to a base end portion of the engaging part 59 and a base end portion of the attaching main body part 57.

Specifically, regarding the left elastic wire 55, the engaging part 59 extends in the up-down direction, the attaching main body part 57 extends in the up-down direction at the left side of the engaging part 59 and the bent part 58 is bent leftward from a lower end of the attaching main body part 57. The connecting part 61 extends in the left-right direction and is connected to an upper end portion of the engaging part 59 and an upper end portion of the attaching main body part 57.

In addition, regarding the right elastic wire 55, the engaging part 59 extends in the up-down direction, the attaching main body part 57 extends in the up-down direction at the right side of the engaging part 59 and the bent part 58 is bent rightward from the lower end of the attaching main body part 57. The connecting part 61 extends in the left-right direction and is connected to the upper end portion of the engaging part 59 and the upper end portion of the attaching main body part 57 (refer to FIG. 6).

Regarding the lower elastic wire 55, the engaging part 59 extends in the left-right direction, the attaching main body part 57 extends in the left-right direction at the lower side of the engaging part 59 and the bent part 58 is bent downward from a left end of the attaching main body part 57. The connecting part 61 extends in the up-down direction and is connected to a right end portion of the engaging part 59 and a right end portion of the attaching main body part 57 (refer to FIG. 11).

<Assembly Structure of Each Elastic Wire to Core Member>

As shown in FIGS. 1 and 2, the core member 20 is provided at peripheries of the through-holes 25 with a lower assembly part 26D, a left assembly part 26L and a right assembly part 26R regarding the elastic wire 55, for each of the through-holes 25. The respective assembly parts 26D, 26L, 26R have a common configuration.

As shown in FIGS. 7 and 12, each of the assembly parts 26D, 26L, 26R has (A) a sliding base part 27, (B) an axial restraint part 28, (C) a surface restraint part 35, (D) a linear movement permission part 40 and (E) a second axial restraint part 45. In the below, the respective parts are described.

(A) Sliding Base Part 27

The sliding base part 27 is a part on which the attaching part 56 slides as the elastic wire 55 is linearly moved, and consists of a plane that is perpendicular to the axial line L of the steering shaft 11.

(B) Axial restraint Part 28

The axial restraint part 28 is to permit the attaching part 56 to linearly move in the assembling direction and to restrain the attaching part 56 engaged to the core member 20 from moving in the axial direction, and has the sliding base part 27 as a part of the axial restraint part and a sub-restraint part 29. The sub-restraint part 29 is provided at a position that is deviated forward from the sliding base part 27 regarding the axial direction.

The sub-restraint part 29 has slightly different structures between the left and right assembly parts 26L, 26R and the lower assembly part 26D.

As shown in at least one of FIGS. 6 to 8A, the left and right assembly parts 26L, 26R have a winding protrusion 30 that protrudes upward, respectively. The respective winding protrusions 30 are provided with protuberances 31 at an upper edge part and an outer edge part (edge part distant from the axial line L). A part of the protuberance 31 configures the sub-restraint part 29.

As shown in at least one of FIGS. 11 to 13A, the lower assembly part 26D has a winding protrusion 32 that protrudes forward. The winding protrusion 32 is provided with a protuberance 33 that protrudes downward from a front end of the winding protrusion. The protuberance 33 configures the sub-restraint part 29.

Accordingly, when the attaching part 56 is linearly moved, the attaching main body part 57 is linearly moved along the sliding base part 27 in the assembling direction. At the state in which the attaching part 56 is engaged to the core member 20, the attaching main body part 57 is disposed between the sliding base part 27 and the sub-restraint part 29 (protuberances 31, 33), so that it is restrained from moving in the axial direction.

(C) Surface Restraint Part 35

As shown in FIGS. 7 and 12, the surface restraint part 35 is to permit the attaching part 56 to linearly move in the assembling direction and to restrain the engaged attaching part 56 from moving in a direction parallel with the orthogonal surface. Here, the direction parallel with the orthogonal surface includes a direction along which the elastic wire 55 linearly moves (linearly moving direction) and a direction that is perpendicular to the linearly moving direction.

The surface restraint part 35 has the winding protrusions 30, 32 and a restraining protrusion 36, as a structure for restraining the attaching part 56 from moving in the linearly moving direction of the elastic wire 55. The winding protrusions 30, 32 are contacted to the connecting parts 61 of the elastic wires 55, thereby restraining the attaching parts 56 connected through the connecting parts 61 from linearly moving in the assembling direction beyond the winding protrusions.

The restraining protrusion 36 is to permit the bent part 58 of the attaching part 56 to surmount the restraining protrusion as the elastic wire 55 is linearly moved and to restrain the bent part 58 having surmounted the restraining protrusion from moving in an opposite direction to the assembling direction, and protrudes forward from the sliding base part 27. The restraining protrusion 36 has an inclined surface 37 that is more distant from the sliding base part 27 at the more forward side thereof in the assembling direction and a step surface 38 that is substantially perpendicular to the sliding base part 27 at the front side of the inclined surface 37 in the assembling direction. The inclined surface 37 consists of a plane that intersects with the sliding base part 27 at a predetermined angle. The inclined surface 37 is to enable the bent part 58 to be distant from the sliding base part 27, against the elastic force of the attaching part 56 that is linearly moving in the assembling direction. The step surface 38 is to restrain the bent part 58, which is made to approach the sliding base part 27 by the elastic restoring force of the attaching part 56, from moving in the opposite direction to the assembling direction.

The surface restraint part 35 has the restraining protrusion 36 and a guide wall part 39, as a structure for restraining the attaching part 56 from moving in a direction perpendicular to the linearly moving direction.

The guide wall part 39 extends in the assembling direction adjacent to the inner side (a side close to the axial line L) of the restraining protrusion 36 and is to guide the attaching main body part 57 from linearly moving in the assembling direction.

Therefore, the attaching main body part 57 is linearly moved along the guide wall part 39 in the assembling direction when the attaching part 56 is linearly moved. In addition, at the state in which the attaching part 56 is engaged to the core member 20, the attaching main body part 57 is disposed between the restraining protrusion 36 and the guide wall part 39, so that the attaching main body part 57 is restrained from moving in the direction parallel with the orthogonal direction, which is the direction perpendicular to the assembling direction.

(D) Linear Movement Permission Part 40

The linear movement permission part 40 is to permit the engaging part 59 to linearly move in the assembling direction.

The linear movement permission part 40 has slightly different structures between the left and right assembly parts 26L, 26R and the lower assembly part 26D.

As shown in at least one of FIGS. 6 to 8A, the left and right assembly parts 26L, 26R have a pair of brackets 41 at the upper and lower sides of the through-holes 25, respectively. Both the brackets 41 are formed with spring insertion holes 42 that are penetrated in the assembling direction (up-down direction) of the elastic wire 55, and the spring insertion holes 42 configure the linear movement permission part 40.

As shown in at least one of FIGS. 11 to 13A, the lower assembly part 26D has a space 43 on a path along which the engaging part 59 is linearly moved when the elastic wire 55 is linearly moved in the assembling direction, and the space 43 configures the linear movement permission part 40.

(E) Second Axial Restraint Part 45

As shown in at least one of FIGS. 7 and 12, the second axial restraint part 45 is to restrain the engaging part 59, which is permitted by the linear movement permission part 40 and thus has been linearly moved in the assembling direction, from moving in the axial direction. The second axial restraint part 45 has a pair of restraining wall part 46, 47 provided at positions offset from each other regarding the axial direction.

The pair of restraining wall parts 46, 47 has slightly different structures between the left and right assembly parts 26L, 26R and the lower assembly part 26D.

As shown in at least one of FIGS. 6 to 8A, in the left and right assembly parts 26L, 26R, one restraining wall part 46 is configured by a surrounding part 48 of the through-hole 25 of the core member 20 and the other restraining wall part 47 is configured by the wall surface of the spring insertion hole 42.

As shown in at least one of FIGS. 11 to 13A, the lower assembly part 26D has a pair of protuberances 49, 50 that protrudes upward at the left and right sides of the through-hole 25. The one protuberance 50 protrudes from the winding protrusion 32. One restraining wall part 46 is configured by a surrounding part 51 of the through-hole 25 of the core member 20 and the other restraining wall part 47 is configured by the left and right protuberances 49, 50.

Accordingly, the engaging part 59 passes between the restraining wall parts 46, 47 when it is linearly moved. In addition, at the state in which the engaging part has been linearly moved in the assembling direction, the engaging part 59 is disposed between the restraining wall parts 46, 47, so that it is restrained from moving in the axial direction.

The steering wheel 12 of this illustrative embodiment is configured as described above.

In the steering wheel 12, when assembling the respective elastic wires 55 to the assembly parts 26D, 26K, 26R, the respective elastic wires 55 are linearly moved in the assembling direction.

Figure 9A:
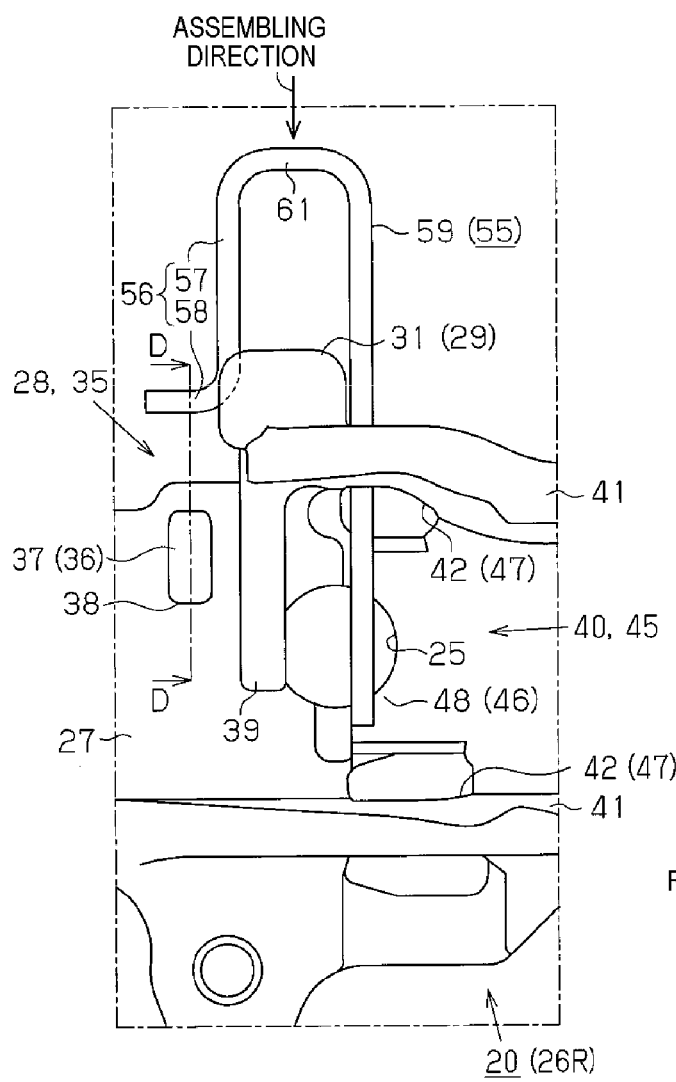
Figure 9B:
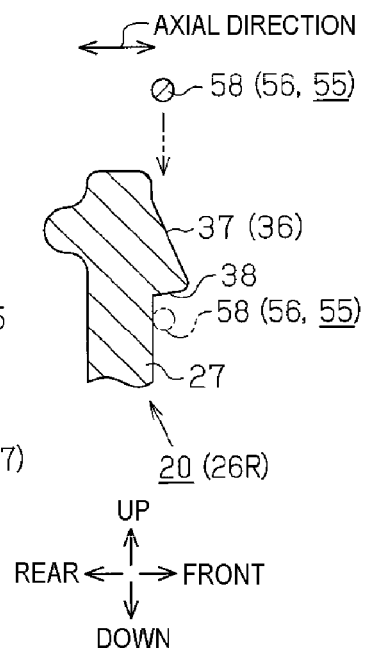

Specifically, in each of the left and right assembly parts 26L, 26R, as shown in FIGS. 9(A) and 9(B), a user grips the elastic wire 55 so that the connecting part 61 is located at the upper side and the engaging part 59 is located at the inner side (side close to the axial line L) of the attaching part 56, and linearly moves the elastic wire 55 downward at the front side of the core member 20 while keeping the state. At this time, the bent part 58 is spaced upward from the restraining protrusion 36. In the lower assembly part 26D, as shown with the dashed-two dotted line in FIGS. 14A and 14B, the user grips the elastic wire 55 so that the connecting part 61 is located at the right side and the engaging part 59 is located at the inner side (side close to the axial line L) of the attaching part 56, and linearly moves the elastic wire 55 leftward at the front side of the core member 20 while keeping the state. At this time, the bent part 58 is spaced rightward from the restraining protrusion 36.

At this time, in the axial restraint part 28 and the surface restraint part 35 of the core member 20, the attaching main body part 57 and the bent part 58, which configure the attaching part 56, are respectively permitted to linearly move in the assembling direction. This is because there is no member restraining the linear movement on the moving path of the attaching main body part 57 and the bent part 58. Here, although the restraining protrusion 36 is formed on the moving path, the restraining protrusion 36 has the inclined surface 37 that is more distant from the sliding base part 27 at the more forward side thereof in the assembling direction and the step surface 38 that is at the front side of the inclined surface 37 in the assembling direction. Accordingly, the bent part 58 of the attaching part 56 can surmount the restraining protrusion 36. Although the restraining protrusion 36 is a resistance to the linear movement of the bent part 58, it does not block the linear movement.

In the linear movement permission part 40, the linear movement of the engaging part 59 in the assembling direction is permitted. This is because there is no member restraining the linear movement on the moving path of the engaging part 59. In other words, in each of the left and right assembly parts 26L, 26R, the pair of upper and lower brackets 41 are provided on the moving path of the engaging part 59. However, the spring insertion holes 42 that are penetrated in the up-down direction are formed at the positions of the respective brackets 41 becoming the moving path. In addition, the part becoming the moving path between the upper and lower brackets 41 is a vacant space. Also, in the lower assembly part 26D, there is no member corresponding to the brackets 41, so that the moving path of the engaging part 59 is configured by the space 43.

The attaching main body part 57, which is permitted to linearly move as described above, is linearly moved along the guide wall part 39, which extends in the assembling direction adjacent to the restraining protrusion 36, in the assembling direction. At this time, if the bent part 58 is bent toward the engaging part 59, the leading end of the bent part 58 may interfere with the guide wall part 39. However, in this illustrative embodiment, the bent part 58 is bent in a direction getting away from the engaging part 59 and the leading end of the bent part 58 is located at the position distant from the guide wall part 39. Accordingly, when the attaching main body part 57 of the elastic wire 55 is linearly moved along the guide wall part 39 in the assembling direction, the leading end of the engaging part 58 does not interfere with the guide wall part 39.

In addition, the bent part 58 of the attaching part 56, which is permitted to linearly move as described above, passes to the restraining protrusion 36 while it is linearly moved along the surface restraint part 35. When passing to the restraining protrusion, the attaching main body part 57 of the attaching part 56 slides on the sliding base part 27.

Figure 10A:
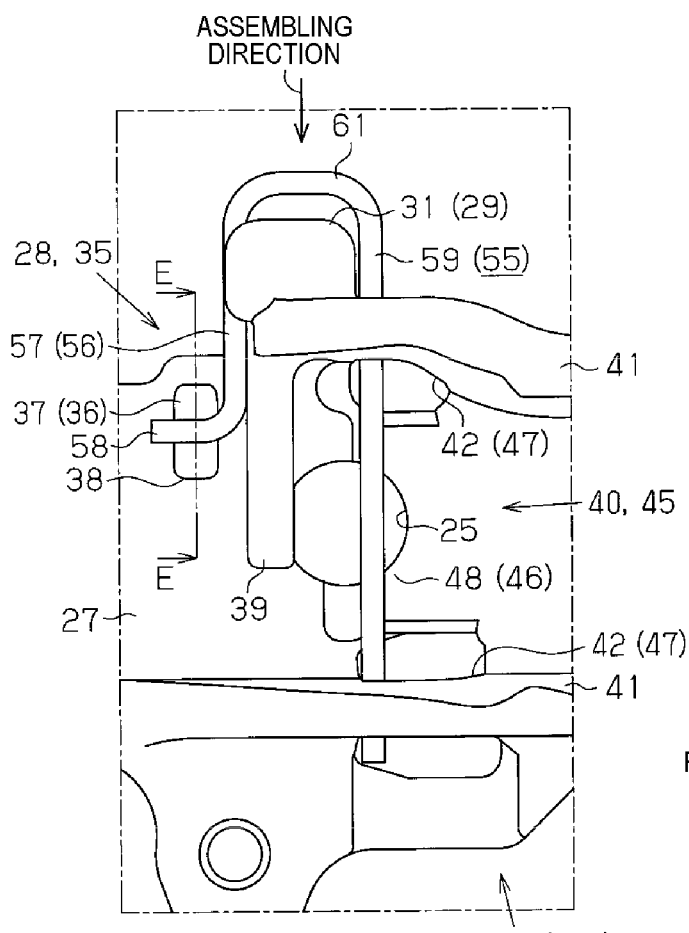
Figure 10B:
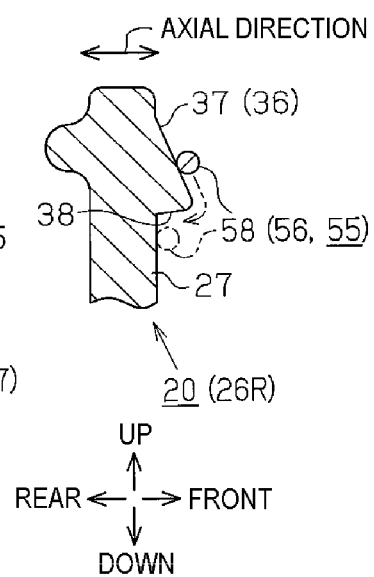
Figure 11:
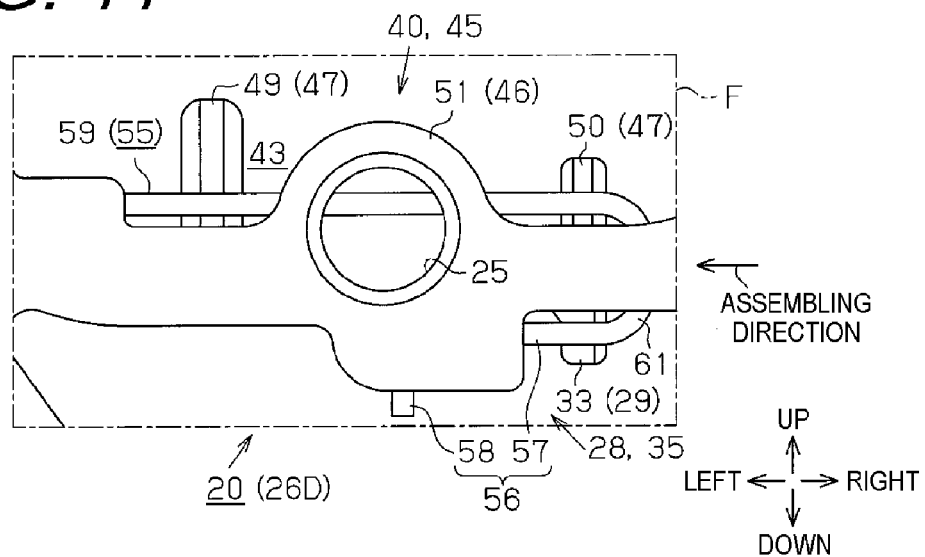
FIG. 11 is a view showing a state in which an elastic wire is assembled to a lower assembly part, which is a partial front view enlarging an F part of FIG. 1.

At this time, as shown with the solid line in FIGS. 10A, 10B and 14, the bent part 58 of the attaching part 56 is permitted to surmount the restraining protrusion 36. In other words, when the bent part 58 passes to the inclined surface 37 of the restraining protrusion 36 as the attaching main body part 57 slides, the bent part 58 becomes more distant forward from the sliding base part 27 at the more forward side thereof in the assembling direction, against the elastic force of the attaching part 56. Accordingly, contrary to Patent Document 1, it is not necessary to move the attaching part 56 so as to bypass the restraining protrusion 36.

When the bent part 58 of the attaching part 56 is linearly moved at least to the position at which it surmounts the restraining protrusion 36 and the bent part 58 is thus moved into the step surface 38 from the inclined surface 37, i.e., surmounts the restraining protrusion 36, the bent part 58 is made to approach the sliding base part 27 by the elastic restoring force of the attaching part 56, as shown in FIGS. 8A, 8B, 13A and 13(B). The elastic wire 55 is engaged to the core member 20. At this engaged state, the restraining protrusion 36 is located adjacent to the bent part 58 in the opposite direction to the assembling direction. In addition, the winding protrusions 30, 32 are located adjacent to the front side of the connecting part 61 of the elastic wire 55 in the assembling direction. Accordingly, the attaching part 56 is restrained from moving in the opposite direction to the assembling direction by the restraining protrusion 36 and is restrained from moving in the assembling direction by the winding protrusions 30, 32.

In addition, the attaching main body part 57 is disposed between the restraining protrusion 36 and the guide wall part 39 and is restrained from moving in the direction parallel with the orthogonal direction, which is the direction perpendicular to the assembling direction.

By doing so, at the engaged state, the movement of the attaching part 56 in the direction parallel with the orthogonal direction, here, the movement of the elastic wire 55 in the linearly moving direction and the movement in the direction perpendicular to the linearly moving direction are restrained.

Also, at this time, the attaching main body part 57 is disposed between the sliding base part 27 and the sub-restraint part 29, which is provided at the position deviated from the sliding base part 27 regarding the axial direction, and is restrained from moving in the axial direction by the sliding base part 27 and the sub-restraint part 29.

In the meantime, the engaging part 59 of the elastic wire 55 having been linearly moved in the assembling direction is restrained from moving in the axial direction by the second axial line restraint part 45 of the core member 20. In other words, the engaging part 59, which is permitted to linearly move, passes between the pair of restraining wall parts 46, 47 provided at the positions offset from each other regarding the axial direction. Then, when the engaging part 59 has been linearly moved in the assembling direction, the engaging part 59 is disposed between the restraining wall parts 46, 47, so that it is restrained from moving in the axial direction.

Then, the pins 74 of the airbag apparatus 65 are inserted into the through-holes 25 of the core member 20 in which the elastic wires 55 are assembled as described above. As the pins are inserted, the engaging parts 59 of the elastic wires 55 are pushed by the pins 54 and are thus elastically deformed. When the pins 74 are inserted into the positions at which the recessed parts 75 correspond to the engaging parts 59, the engaging parts 59 are introduced into the recessed parts 75 by the elastic restoring force. The engaging parts 59 are engaged into the recessed parts 75 so that the pins 74 are not separated. As the engaging parts 59 are engaged with the pins 74, the airbag apparatus 65 is elastically engaged to the core member 20.

According to the above illustrative embodiment, the following operational effects are realized.

(1) As the elastic wire 55, the elastic wire having the attaching part 56 provided to the core member 20 and the engaging part 59 engaged into the recessed part 75 of the through-hole 25 is used.

The core member 20 is provided with the axial restraint part 28 that permits the attaching part 56 to linearly move in the assembling direction and restrains the attaching part 56 engaged to the core member 20 from moving in the axial direction. In addition, the core member 20 is provided with the surface restraint part 35, which permits the attaching part 56 to linearly move in the assembling direction and restrains the engaged attaching part 56 from moving in the direction parallel with the orthogonal surface, and the linear movement permission part 40, which permits the engaging part 59 to linearly move in the assembling direction. Also, as a part of the surface restraint part 35, the restraining protrusion 36 that permits the attaching part 56 to surmount the restraining protrusion as it is linearly moved and restrains the attaching part 56 having surmounted from moving in the opposite direction to the assembling direction is provided.

Accordingly, just by performing the simple operation of linearly moving the elastic wires 55 in the assembling direction, it is possible to assemble the elastic wires 55 to the core member 20 in a short time and to restrain the attaching parts 56 from moving not only in the axial direction but also in the direction parallel with the orthogonal surface.

(2) As the attaching part 56, the attaching part having the attaching main body part 57 that extends in the assembling direction and the bent part 58 that is bent from the extension end of the attaching main body part 57 in the direction intersecting with the assembling direction on the orthogonal surface is used. At the bent part 58, the attaching part 56 is restrained from surmounting the restraining protrusion 36 and moving in the opposite direction to the assembling direction as the elastic wire 55 is linearly moved.

Accordingly, by linearly moving the bent part 58 to the position at which the bent part surmounts the restraining protrusion 36, it is possible to restrain the bent part 58 from moving in the opposite direction to the assembling direction by the restraining protrusion. Hence, it is possible to securely realize the above effect (1).

(3) As the elastic wire 55 is linearly moved, the attaching part 56 slides. The sliding base part 27 having the restraining protrusion 36 protruding therefrom is provided to the core member 20. The restraining protrusion 36 has the inclined surface 37 that is more distant from the sliding base part 27 at the more forward side thereof in the assembling direction and the step surface 38 that is substantially perpendicular to the sliding base part 27 at the front side of the inclined surface 37 in the assembling direction.

Accordingly, by moving the bent part 58 along the inclined surface 37, it is possible to enable the bent part 58 to be distant forward from the sliding base part 27, against the elastic force of the attaching part 56 linearly moving in the assembling direction. Also, it is possible to restrain the bent part 58, which has approached the sliding base part 27 by the elastic restoring force of the attaching part 56, from moving in the opposite direction to the assembling direction by the step surface 38.

(4) As a part of the surface restraint part 35, in addition to the restraining protrusion 36, the guide wall part 39, which extends in the assembling direction adjacent to the restraining protrusion 36 and guides the attaching main body part 57 to linearly move in the assembling direction, is provided.

Accordingly, when the attaching part 56 is linearly moved, it is possible to linearly move the attaching main body part 57 along the guide wall part 39 in the assembling direction.

In addition, at the state in which the attaching part 56 is engaged to the core member 20, it is possible to dispose the attaching main body part 57 between the restraining protrusion 36 and the guide wall part 39. Hence, it is possible to restrain the attaching main body part 57 from moving in the direction parallel with the orthogonal direction, which is the direction perpendicular to the assembling direction.

(5) The bent part 58 of the attaching part 56 is bent in the direction getting away from the engaging part 59. Accordingly, when the attaching main body part 57 of the elastic wire 55 is linearly moved along the guide wall part 39 in the assembling direction, it is possible to avoid the leading end of the bent part 58 from interfering with the guide wall part 39.

(6) The sliding base part 27 is made as a part of the axial restraint part 28 and the sub-restraint part 29, which is provided at the position deviated from the sliding base part 27 regarding the axial direction, is made as a part of the axial restraint part 28.

Accordingly, when the attaching part 56 is linearly moved, it is possible to linearly move the attaching main body part 57 along the sliding base part 27 in the assembling direction.

In addition, at the state in which the attaching part 56 is engaged to the core member 20, it is possible to dispose the attaching main body part 57 between the sliding base part 27 and the sub-restraint part 29. Hence, it is possible to restrain the attaching main body part 57 from moving in the axial direction.

(7) The core member 20 is provided with the second axial restraint part 45.

Accordingly, it is possible to restrain the engaging part 59, which is permitted by the linear movement permission part 40 and thus has been linearly moved in the assembling direction, from moving in the axial direction.

(8) As a part of the second axial restraint part 45, the pair of restraining wall parts 46, 47 is provided at the positions offset from each other regarding the axial direction.

Accordingly, when the elastic wire 55 is linearly moved, it is possible to linearly move the engaging part 59 between the restraining wall parts 46, 47. In addition, at the state in which the engaging part 59 has been linearly moved in the assembling direction, it is possible to dispose the engaging part 59 between the restraining wall parts 46, 47 and to thus restrain the engaging part from moving in the axial direction. Hence, it is possible to securely realize the above effect (7).

(9) In the elastic wire (engaging spring) 105 that is used in Patent Document 1, the knobs 109 are formed on the surface including the axial line and the attaching part (parallel extending part) 106 and the engaging part (parallel extending part) 107 are formed on the orthogonal surface perpendicular to the axial line.

However, in the above illustrative embodiment, both the attaching part 56 (attaching main body part 57 and bent part 58) and the engaging part 59 configuring the elastic wire 55 are formed on the orthogonal surface. Accordingly, it is possible to manufacture the elastic wire 55 more easily than the elastic wire of Patent Document 1.

In the meantime, the invention can be also embodied as the following illustrative embodiments.

In the above illustrative embodiment, the bent part 58 is bent in the direction getting away from the engaging part 59. However, as shown in FIG. 15, the bent part 58 may be bent in a direction coming close to the engaging part 59. In this case, a part of the attaching main body part 57 may be bent toward the engaging part 59 more highly than the bent part 58 and the leading end thereof may be brought into contact with the guide wall part 39. By doing so, it is possible to linearly move the attaching part 56 along the guide wall part 39 in the assembling direction only at the attaching main body part 57. Also, it is possible to suppress the bent part 58 from interfering with the guide wall part 39.

The inclined surface 37 of the restraining protrusion 36 may be an arbitrary surface inasmuch as it is more distant forward from the sliding base part 27 at the more forward side thereof in the assembling direction, and the inclined angle of the inclined surface to the sliding base part 27 may be configured by the other planes. In addition, the inclined surface 37 may be configured by a curved surface.

The step surface 38 of the restraining protrusion 36 may be somewhat inclined inasmuch as it is almost perpendicular to the sliding base part 27.

As the structure of the respective assembly parts 26D, 26L, 26R, contrary to the above illustrative embodiment, the engaging part 59 of the elastic wire 55 may be assembled to a more outer side (a side distant from the axial line L) than the attaching part 56.

As the structure of the lower assembly part 26D, contrary to the above illustrative embodiment, the elastic wire 55 may be assembled from left to right.

The vehicle to which the steering wheel 12 of the invention is applied is not limited to the automobile and includes a variety of industrial vehicles.

The invention is not limited to the vehicle and can be applied to the steering wheel 12 of a steering apparatus in the other vehicles such as airplane, ship and the like.

What is claimed is:

1. A steering wheel having an airbag apparatus attached thereto, the steering wheel comprising:
    a core member having a through-hole that is penetrated in an axial direction parallel with an axial line of a steering shaft;
    an airbag apparatus having a pin that protrudes toward the core member, the pin having a recessed part on an outer surface thereof and being inserted into the through-hole, and
    an elastic wire that is linearly moved in an assembling direction parallel with an orthogonal surface perpendicular to the axial line and is thus assembled to the core member,
    wherein the elastic wire has an attaching part that is attached to the core member and an engaging part that is engaged to the recessed part in the through-hole,
    wherein the core member has an axial restraint part that permits the attaching part to linearly move in the assembling direction and restrains the attaching part engaged to the core member from moving in the axial direction, a surface restraint part that permits the attaching part to linearly move in the assembling direction and restrains the engaged attaching part from moving in a direction parallel with the orthogonal surface, and a linear movement permission part that permits the engaging part to linearly move in the assembling direction, and
    wherein the surface restraint part has a restraining protrusion that permits the attaching part to surmount the restraining protrusion as the attaching part is linearly moved and restrains the attaching part having surmounted the restraining protrusion from moving in an opposite direction to the assembling direction,
    wherein a linear movement direction of the elastic wire that permits the attaching part to surmount the restraining protrusion, is the assembling direction of the elastic wire.

2. The steering wheel according to claim 1, wherein the core member further comprise a second axial restraint part that restrains the engaging part, which has been thus linearly moved in the assembling direction as permitted by the linear movement permission part, from moving in the axial direction.

3. The steering wheel according to claim 2, wherein the second axial restraint part has a pair of restraining wall parts, which are provided at positions offset from each other regarding the axial direction, and
    wherein the engaging part passes between both the restraining wall parts when the engaging part is linearly moved, and the engaging part is disposed between both the restraining wall parts at a state in which the engaging part has been linearly moved in the assembling direction, so that the engaging part is restrained from moving in the axial direction.

4. A steering wheel having an airbag apparatus attached thereto, the steering wheel comprising:
    a core member having a through-hole that is penetrated in an axial direction parallel with an axial line of a steering shaft;
    an airbag apparatus having a pin that protrudes toward the core member, the pin having a recessed part on an outer surface thereof and being inserted into the through-hole, and
    an elastic wire that is linearly moved in an assembling direction parallel with an orthogonal surface perpendicular to the axial line and is thus assembled to the core member,
    wherein the elastic wire has an attaching part that is attached to the core member and an engaging part that is engaged to the recessed part in the through-hole,
    wherein the core member has an axial restraint part that permits the attaching part to linearly move in the assembling direction and restrains the attaching part engaged to the core member from moving in the axial direction, a surface restraint part that permits the attaching part to linearly move in the assembling direction and restrains the engaged attaching part from moving in a direction parallel with the orthogonal surface, and a linear movement permission part that permits the engaging part to linearly move in the assembling direction, and
    wherein the surface restraint part has a restraining protrusion that permits the attaching part to surmount the restraining protrusion as the attaching part is linearly moved and restrains the attaching part having surmounted the restraining protrusion from moving in an opposite direction to the assembling direction,
    wherein the attaching part has an attaching main body part that extends in the assembling direction and a bent part that is bent from an extension end of the attaching main body part in a direction intersecting with the assembling direction on the orthogonal surface, and
    wherein the bent part of the attaching part is restrained from surmounting the restraining protrusion and moving in the opposite direction to the assembling direction as the elastic wire is linearly moved.

5. The steering wheel according to claim 4, wherein the core member has a sliding base part that the attaching parts slides thereon as the elastic wire is linearly moved and has the restraining protrusion protruding therefrom,
    wherein the restraining protrusion has an inclined surface that is more distant from the sliding base part at a more forward side thereof in the assembling direction and a step surface that is substantially perpendicular to the sliding base part at a front side of the inclined surface in the assembling direction,
    wherein the inclined surface enables the bent part to be distant from the sliding base part against elastic force of the attaching part linearly moving in the assembling direction, and
    wherein the step surface restrains the bent part, which is made to approach the sliding base part by elastic restoring force of the attaching part, from moving in the opposite direction to the assembling direction.

6. The steering wheel according to claim 5, wherein the axial restraint part has, as a part of the axial restraint part, the sliding base part and also has a sub-restraint part that is provided at a position deviated from the sliding base part regarding the axial direction, and wherein the attaching main body part is linearly moved along the sliding base part in the assembling direction when the attaching part is linearly moved, and the attaching main body part is disposed between the sliding base part and the sub-restraint part and is thus restrained from moving in the axial direction when the attaching part is engaged to the core member.

7. The steering wheel according to claim 4, wherein the surface restraint part has, in addition to the restraining protrusion, a guide wall part that extends in the assembling direction adjacent to the restraining protrusion and guides the attaching main body part to linearly move in the assembling direction, and wherein the attaching main body part is linearly moved along the guide wall part in the assembling direction when the attaching part is linearly moved, and the attaching main body part is disposed between the restraining protrusion and the guide wall part and is thus restrained from moving in a direction parallel with the orthogonal surface, which is a direction perpendicular to the assembling direction, when the attaching part is engaged to the core member.

8. The steering wheel according to claim 7, wherein the bent part is bent in a direction getting away from the engaging part.

* * * * *